No. 608,568. Patented Aug. 9, 1898.
A. BLECHYNDEN.
FEED WATER REGULATOR FOR BOILERS.
(Application filed May 16, 1896.)
(No Model.) 6 Sheets—Sheet 1.

Witnesses
H. van Ijdenneel
E. L. Giles

Inventor
Alfred Blechynden
by
Attorney.

No. 608,568. Patented Aug. 9, 1898.
A. BLECHYNDEN.
FEED WATER REGULATOR FOR BOILERS.
(Application filed May 16, 1896.)
(No Model.) 6 Sheets—Sheet 2.
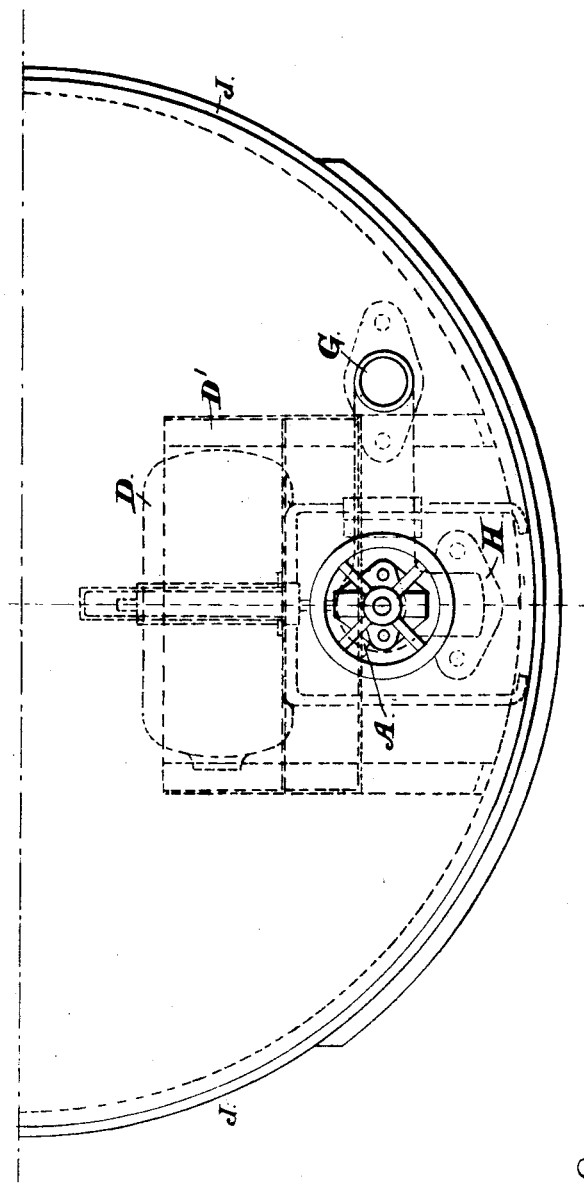
Fig. 2.
Witnesses
H. van Oldenneel
E. L. Giles
Inventor
Alfred Blechynden
by
Attorneys No. 608,568. Patented Aug. 9, 1898.
A. BLECHYNDEN.
FEED WATER REGULATOR FOR BOILERS.
(Application filed May 16, 1896.)
(No Model.) 6 Sheets—Sheet 3.
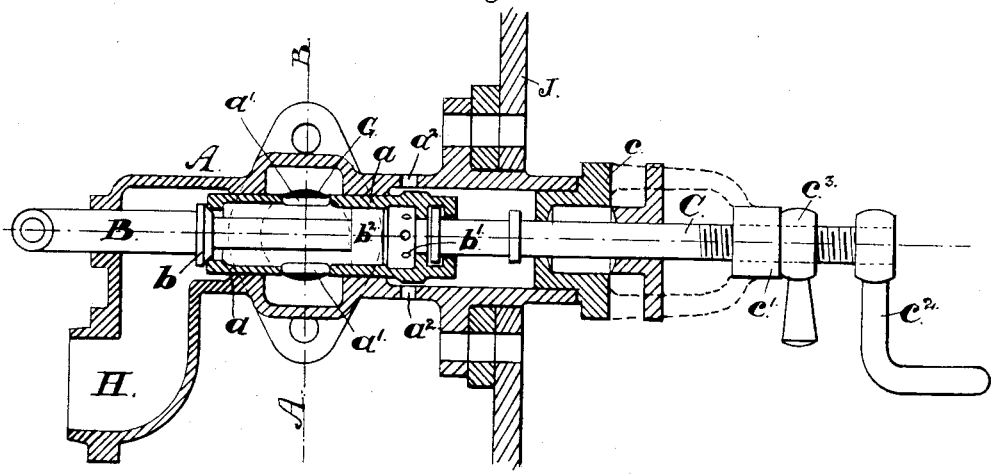
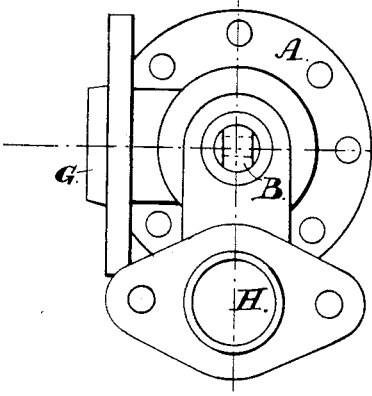
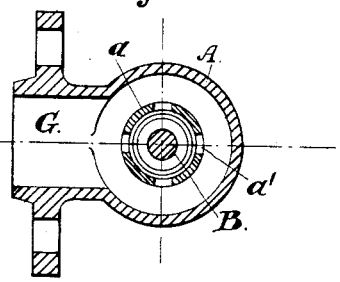
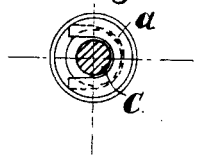
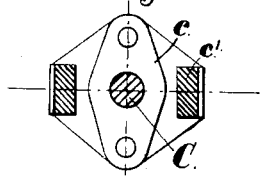
Witnesses
H. van Oldenneel
E. L. Giles
Inventor
Alfred Blechynden
by
Attorneys No. 608,568. Patented Aug. 9, 1898.
A. BLECHYNDEN.
FEED WATER REGULATOR FOR BOILERS.
(Application filed May 16, 1896.)
(No Model.) 6 Sheets—Sheet 4.
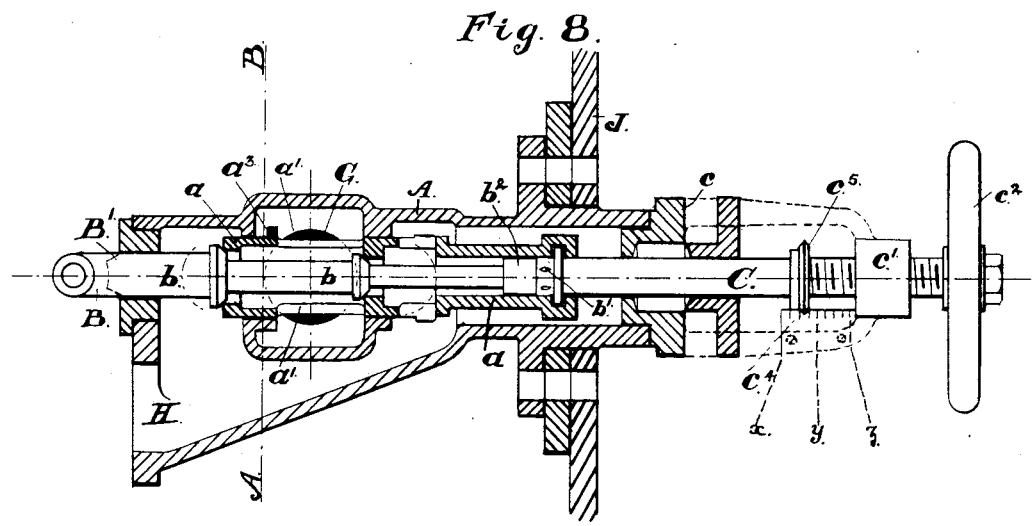
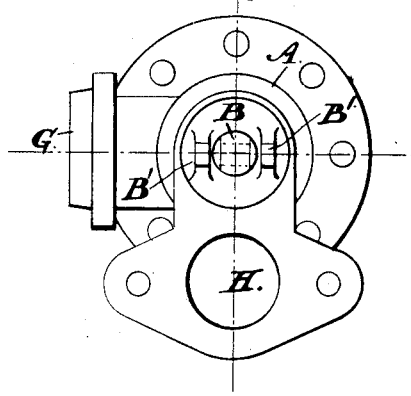
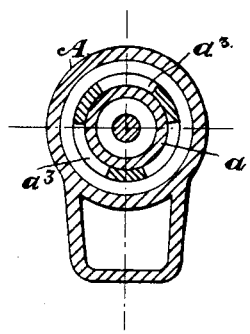
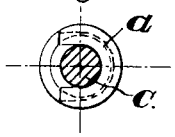
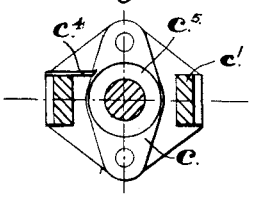
Witnesses
H. van Oldenmeel
E. L. Giles
Inventor
Alfred Blechynden
by
Attorneys No. 608,568. Patented Aug. 9, 1898.
A. BLECHYNDEN.
FEED WATER REGULATOR FOR BOILERS.
(Application filed May 16, 1896.)
(No Model.) 6 Sheets—Sheet 6.
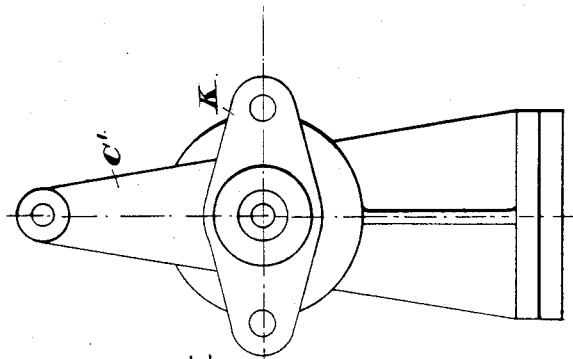
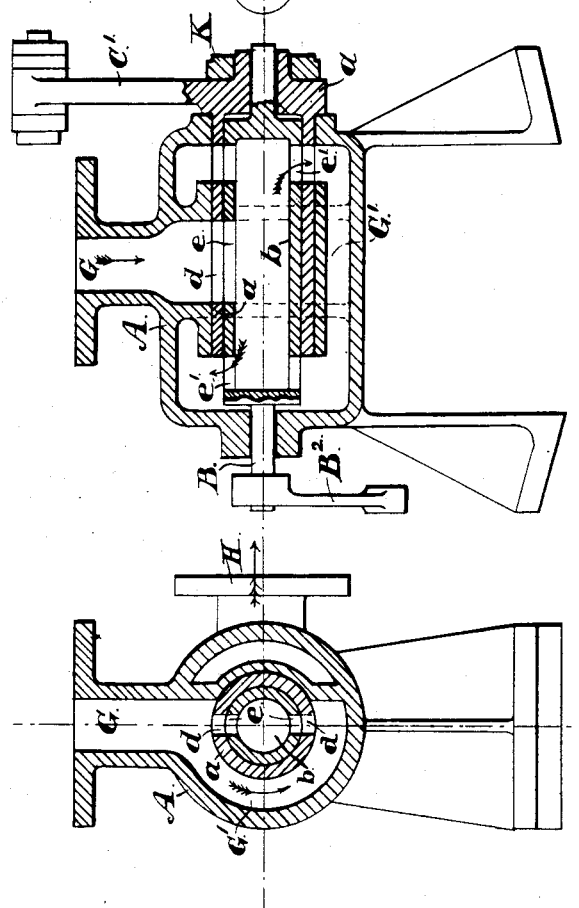

UNITED STATES PATENT OFFICE.

ALFRED BLECHYNDEN, OF BARROW-IN-FURNESS, ENGLAND.

FEED-WATER REGULATOR FOR BOILERS.

SPECIFICATION forming part of Letters Patent No. 608,568, dated August 9, 1898.

Application filed May 16, 1896. Serial No. 591,819. (No model.) Patented in England June 8, 1895, No. 11,253; in Germany April 12, 1896, No. 91,153; in France April 17, 1896, No. 255,614; in Italy June 30, 1896, No. 81/291; in Denmark December 11, 1896, No. 874, and in Austria February 9, 1897, No. 47/440.

*To all whom it may concern:*

Be it known that I, ALFRED BLECHYNDEN, a subject of the Queen of Great Britain and Ireland, and a resident of Barrow-in-Furness, England, have invented certain new and useful Feed-Water Regulators for Boilers, of which the following is a specification.

The invention has been patented in Great Britain, No. 11,253, dated June 8, 1895; in France, No. 255,614, dated April 17, 1896; in Germany, No. 91,153, dated April 12, 1896; in Denmark, No. 874, dated December 11, 1896; in Italy, No. 81/291, dated June 30, 1896, and in Austria, No. 47/440, dated February 9, 1897.

This invention relates to apparatus for regulating the admission of feed-water to boilers in which a feed-admission valve is actuated by a float on the surface of the water in such boilers.

The invention consists in the combination and arrangement of elements hereinafter specified.

Figure 1:
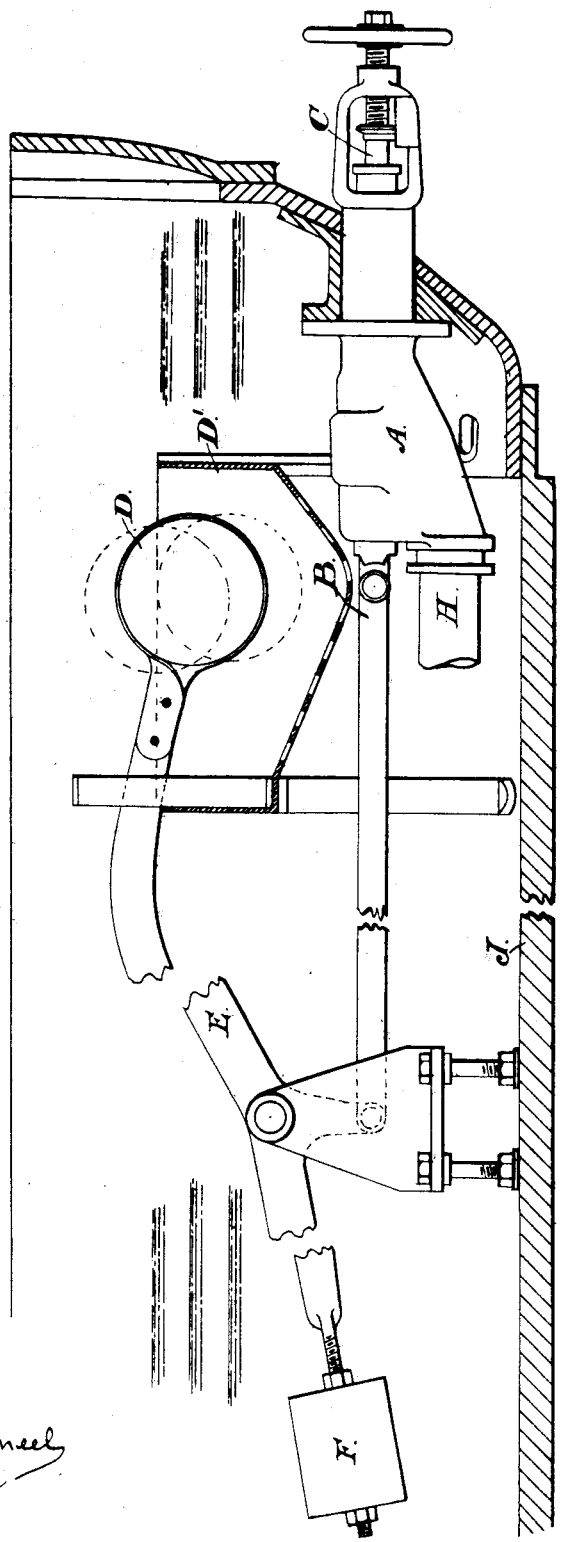
Figure 13:
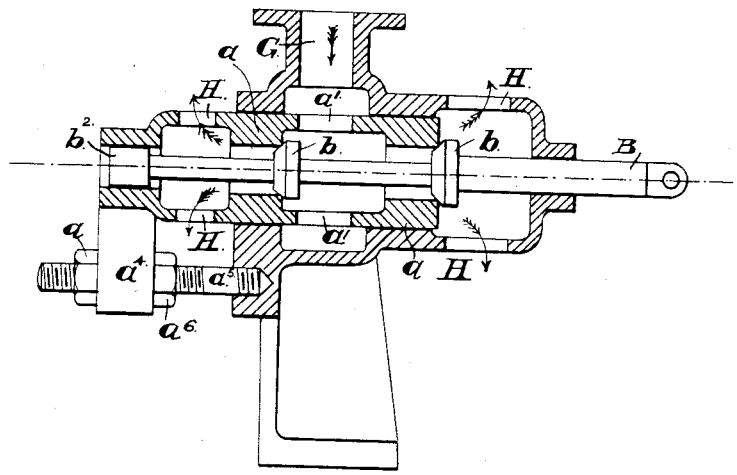

In the drawings hereto annexed, Figure 1 is a side view, and Fig. 2 an end view, showing the general arrangement of a feed-admission valve according to this invention as applied to the upper chamber of a water-tube boiler. Fig. 3 is a sectional elevation of the valve and its seat. Fig. 4 is an end view. Fig. 5 is a section on line A B, Fig. 3. Figs. 6 and 7 are details. Fig. 8 is a sectional view of a modification. Figs. 9, 10, 11, and 12 are details of the same. Fig. 13 is a sectional view of another modification. Fig. 14 is a sectional view of another modification. Figs. 15 and 16 are detail views relating thereto, and Fig. 17 a sectional view of another modified form of valve and its seating.

A denotes the feed-admission valve, B its spindle, and C a spindle by which the position of its seating is adjusted. D is the float, E the float-lever, and F is a counterpoise thereon. G is the feed-inlet, and H its outlet, J being the shell of the boiler. Three water-levels are indicated in Fig. 1, the positions of the float D corresponding with these levels being dotted in the figure. To protect it from the effect of violent ebullition, the float D is located in a chamber D', having perforations. The chest A has inlet and outlet ports G H, respectively. Within the chest A is a sleeve $a$, upon one end of which the valve $b$ is seated. The valve $b$ is carried by the spindle B, which is coupled to the float-lever. The sleeve $a$ is movable longitudinally and is caused to approach or recede from the valve $b$ by a screwed rod C passing through a gland $c$ and screwed bracket $c'$ outside of the boiler, a hand-lever $c^2$ and lock-nut $c^3$ being mounted on the rod C. The sleeve $a$ has ports $a'$ in permanent communication with the valve-chest A and feed-inlet G. Ports $a^2$ in the chest A admit boiler-pressure in front of the sleeve $a$, and similar ports $b'$ admit it in front of the piston $b^2$ on the valve-spindle B, thus preserving approximate equilibrium in these parts. Fig. 6 shows connection of the spindle C to the sleeve $a$, and Fig. 7 is an end view of the gland $c$ and bracket $c'$. As the sleeve $a$ is caused to approach or recede from the valve $b$ by turning the hand-lever $c^2$, the position of the float-lever E, Fig. 1, at which it closes the valve is changed, and consequently the level of water in the boiler at which feed-water is permitted to enter or is cut off is determined.

In the following modifications of the apparatus above described like or equivalent parts are lettered alike in the drawings, their functions being similar to the parts correspondingly lettered in Figs. 3 to 7.

In Fig. 8 boiler-pressure within the chest A is exerted on both valves $b$ $b$, the piston $b^2$ merely acting as a guide to the spindle B. The port $a^3$ permits a free inflow of feed-water when the sleeve $a$ is drawn back sufficiently to uncover it, the valves $b$ $b$ being prevented from following the sleeve $a$ by the stops B' abutting against the end of the float-lever connecting-rod. $c^4$ is an index-plate on which the index-wheel $c^5$ indicates the position of the sleeve $a$, the distance $x\,y$ representing regulated inflow, and $z$ the position of sleeve $a$ when there is a free inflow through the port $a^3$. Fig. 9 is an end view of Fig. 8. Fig. 11 shows connection of sleeve $a$ and spindle C, and Fig. 12 is an end view of gland $c$ and bracket $c'$.

In Fig. 13 the sleeve $a$ is adjustable within the boiler by a lug $a^4$ and nuts $a^6$ on the screwed stud $a^5$, the operation of the valve being otherwise identical with those above described.

In Fig. 14 the sleeve $a$ and valve $b$ have rotary movement in place of longitudinal movement. The lever $B^2$, mounted on the valve-spindle B, may be coupled to the float-lever E, Fig. 1, or the float-lever E may be mounted directly on the spindle B. The lever $C'$, mounted on the sleeve $a$, may be controlled by a hand operating connection similar to those already described, by which it may be adjusted. From the inlet G a semi-annular passage $G'$ leads around the sleeve $a$. Communication between the passage $G'$ and the interior of the valve $b$ exists by way of ports $d$ in the sleeve $a$ and ports $e$ in the valve $b$, the exit from $b$ to the chest A and outlet H being by way of the ports $e'$. As the sleeve $a$ is moved circumferentially in either direction the circumferential distance to be traveled by the valve $b$ before a free passage through the ports $d$ and $e$ is established or cut off is varied. Consequently more or less travel is allowed to the float-lever E, Fig. 1, and thus the levels of water in the boiler at which feed-water is permitted to enter or is cut off are determined. Fig. 15 is a cross-section of the valve, and Fig. 16 is an end view showing keep-plate K for securing the sleeve $a$ and valve $b$ in place.

Figure 17:
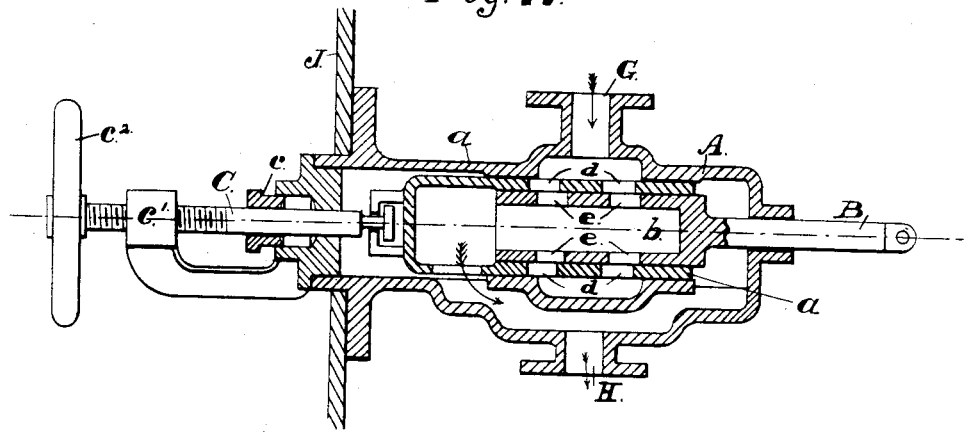

In Fig. 17 the hollow valve $b$ and sleeve $a$ are movable longitudinally instead of circumferentially, the operation of the valve being otherwise identical with that shown in Figs. 14 to 16.

Having now described this invention, what I claim as new, and desire to secure by Letters Patent, is—

1. In apparatus for regulating the inflow of feed-water to a boiler, the combination of a valve $b$ operated by a float D on the surface of the water in said boiler, with a valve-seating $a$ which is capable of longitudinal adjustment relatively to said valve by means of a screwed rod C working in a gland $c$ and screwed bracket $c'$ on the shell J of said boiler, as herein described.

2. In apparatus for regulating the inflow of feed-water to a boiler, the combination of a valve $b$ operated by a float D on the surface of the water in said boiler, with a valve-seating $a$ which is capable of longitudinal adjustment relatively to said valve, said seating being provided with a port $a^3$ by which a free inflow of feed-water may take place when the seating $a$ is withdrawn sufficiently to uncover it, the valve $b$ being prevented from following the seating $a$ by the stops $B'$, as described.

In witness whereof I have hereunto set my hand in presence of two witnesses.

ALFRED BLECHYNDEN.

Witnesses:
GEO. ROBINSON,
WM. DUNBAR.